(No Model.)
H. D. SHAIFFER.
NAILLESS HORSESHOE.
No. 596,248. Patented Dec. 28, 1897.
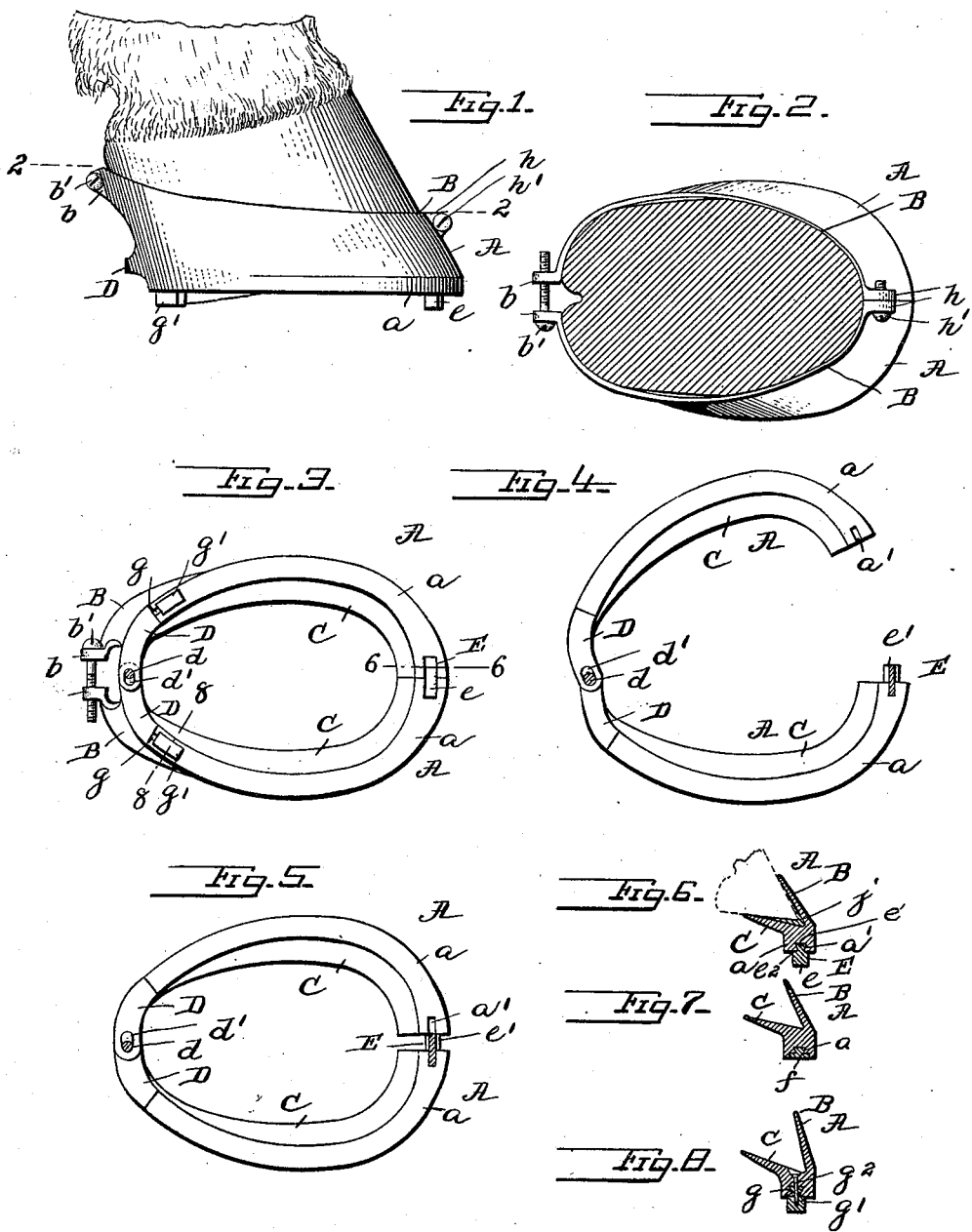
WITNESSES:
Jesse B. Heller
Frank S. Busser
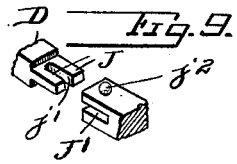
INVENTOR
Harry D. Shaiffer
BY
Harding & Harding
ATTORNEYS
THE NORRIS PETERS CO., PHOTO-LITHO., WASHINGTON, D. C.

UNITED STATES PATENT OFFICE.

HARRY D. SHAIFFER, OF PHILADELPHIA, PENNSYLVANIA.

NAILLESS HORSESHOE.

SPECIFICATION forming part of Letters Patent No. 596,248, dated December 28, 1897.

Application filed July 1, 1897. Serial No. 643,087. (No model.)

*To all whom it may concern:*

Be it known that I, HARRY D. SHAIFFER, a citizen of the United States, residing at Philadelphia, county of Philadelphia, and State of Pennsylvania, have invented a new and useful Improvement in Horseshoes, of which the following is a full, clear, and exact description, reference being had to the accompanying drawings, which form a part of this specification.

My invention relates to horseshoes, and has for its object to provide a new and improved form of horseshoes which may be secured to the hoof without the use of nails and which may be readily removed when desired. It is in some respects an improvement on the horseshoe patented by me December 17, 1895, No. 551,407, and on the horseshoe for which I filed an application for Letters Patent on the 7th of August, 1895, Serial No. 558,530.

To particularize, the main object of my invention is to provide a nailless horseshoe which is constructed upon a new principle, so as to prevent the shoe slipping forward and thus becoming loose or sliding off the hoof. To this end the shoe is constructed in two parts or halves, each provided with an upwardly-extending flange adapted to engage the outer surface of the hoof, and an inwardly-extending flange adapted to rest against the under surface of the hoof. The two parts or halves are pivotally connected at the rear, a suitable locking device is provided for detachably securing the front ends of said parts or halves together, and means are provided to bring the rear ends of the parts or halves together, the pivotal connection at the rear being of such a character that the two parts or halves may move toward or slide upon each other without necessarily severing the pivotal connection. The pivotal connection at the rear enables the shoe to be first fitted loosely upon the hoof and then clamped upon the hoof by interlocking the front ends and then bringing the rear ends together until the shoe is tightly clamped upon the hoof. By this means the front ends of the halves are first clamped upon the hoof with a moderate pressure, while the rear ends are still loose upon the hoof, and then the whole shoe is firmly and uniformly clamped upon the hoof by bringing together the rear ends, the pivotal connection being shifted to the front. If the shoe is constructed, as in my application, Serial No. 558,530, so that there is a fixed pivotal connection at the rear and a clamping and interlocking device only at the front, it is difficult to obtain an absolutely uniform pressure of the shoe upon the hoof, and the tight clamping at the front tends to throw or force the hoof backwardly and upwardly, thus really decreasing the grip of the shoe upon the hoof and resulting occasionally in the shoe slipping forwardly off the hoof. My present invention, it is believed, entirely obviates these objections, as the pressure upon both the front and rear parts of the hoof can be accurately adjusted and made absolutely uniform, while the clamping of the shoe upon the hoof by bringing together the rear ends forces the hoof forwardly, transversely, and downwardly instead of backwardly, as would be the case if the clamping were effected by bringing together the front ends, making accidental disengagement practically impossible.

My invention also consists in details of construction constituting what I believe to be the best embodiment of my invention.

The invention will be more fully understood by reference to the accompanying drawings, in which—

Figure 1 is a side elevation of the shoe on the hoof; Fig. 2, a plan section on line 2 2 of Fig. 1; Fig. 3, an inverted plan view of the shoe. Fig. 4 is an inverted plan view of the lower flanges of the shoe, the sections being swung apart on the rear pivot. Fig. 5 is a similar view showing the two sections swung toward each other on the rear pivot and the interlocking devices at the front in position to be engaged. Fig. 6 is a section on line 6 6, Fig. 3, showing the interlocking device performing the function of a toe-calk. Fig. 7 is a view similar to Fig. 6, showing the interlocking device, the toe-calk being dispensed with. Fig. 8 is a section on the line 8 8 of Fig. 3, and Fig. 9 is a perspective view of a modified form of locking device.

A A designate the two parts or halves, and *a* the base, of the shoe, which is of suitable shape and size to fit the hoof. Each of the parts or halves A is provided with an upwardly and inwardly extending flange B, arranged so as to rest against the outer surface of the hoof, and a flange C, extending inwardly and somewhat upwardly from the inner edge of each of the parts or halves A, said flange C being suitably shaped to fit the concave under surface of the hoof. Extensions D are provided, preferably extending from the rear flanges C and base $a$, which extensions are prolonged inwardly and adjustably pivoted by means of a pin $d$ on one extension engaging a slot $d'$ in the other extension. If desired, both extensions may be slotted and a pin passed through both slots. The upper flanges B are shown prolonged rearwardly until they nearly or quite contact at their rear extremities when the shoe is in position on the hoof, but are preferably cut away underneath at their rear ends. At or near the closely-approximating rear ends of the flanges B are lugs $b$, which project rearwardly therefrom. One of these lugs is provided with a threaded orifice adapted to be engaged by a bolt or screw $b'$, which also passes through a plain orifice in the other lug. For this means of bringing together the flanges B may be substituted a right-and-left screw or any other suitable device.

The base $a$ of the shoe, at the front end of each section of the shoe, is recessed at $a'$, as shown in Figs. 6 and 7, the said recess having inclined side walls and being narrower at its mouth than at its base. These two recesses are in alinement with each other and are adapted to receive an interlocking device E. (Shown in section in Fig. 6.) This interlocking device consists of a base $e$, forming a toe-calk, and a projection $e'$, shaped in cross-section like the recesses $a'$ and adapted to slide longitudinally into either of the said recesses. The base $e$ is wider than the projection $e'$, forming the shoulder $e^2$, adapted to abut against the base of the shoe. If it is not desired to provide the shoe with toe-calks, the base $e$ is cut off, or the interlocking device and recesses may be formed as shown in Fig. 7, wherein the recess is shown sunk to a certain depth and inset still farther to form a groove similar in shape to the recess of Fig. 6. The interlocking device $f$ is similar in size and shape to this recess, so that when the front ends of the sections are brought together the base presents a smooth under surface.

If it is desired to provide the shoe with heel-calks, this may be done by forming in the rear ends of the base recesses $g$, similar in cross-section to the recesses $a'$ in the front ends of the base, and heel-calks $g'$, similar in shape to the interlocking toe-calk E, are slid into these recesses from the rear and are held in place by means of the screw $g^2$. (Shown in Fig. 8.)

Lugs $h$ project forwardly from the front ends of the flanges B, and these lugs are adapted to be approximated or brought toward each other by means of a screw or bolt $h'$ in the same manner that the lugs $b$ are approximated. Any other suitable device may be substituted.

In practice the shoe is placed on the horse's hoof preferably in the following manner: The overgrowth of the horny substance at the edge of the base of the hoof is pared or trimmed off level and the shoe is then placed loosely on the hoof by swinging the sections toward each other from the position shown in Fig. 4 to that shown in Fig. 5, the center of oscillation being the pin $d$. The interlocking toe-calk E is previously placed in one of the recesses $a'$. If necessary, the upper flanges are then hammered down against or toward the side of the hoof, so that when the shoe is clamped upon the hoof only the upper edges of the upper flanges will engage the hoof, and a slight space will be left between the shoe and the hoof to provide for the slight expansion in the hoof which occurs when the horse rests his weight upon it. A slight space will also be left beneath the outer edge of the hoof to provide for the horny growth which is constantly taking place at that point. The bolt $h'$ is then turned to bring the front ends of the sections together, clamping the front parts of the sections with a moderate pressure upon the hoof, while the back parts of the sections fit comparatively loosely on the hoof. The screw $b'$ is then turned to bring the rear ends of the sections toward each other, thus exerting a clamping pressure upon the whole hoof, but a greater pressure upon the back part thereof, and at the same time exerting a forward pressure upon the hoof, or, rather, causing a backward, upward, and lateral pressure of the shoe upon the hoof. The bolts $h'$ and $b'$ may be alternately turned, if desired, until the shoe is clamped with the desired firmness upon the hoof.

A shoe constructed according to my present invention need not exactly fit the hoof to which it is applied, as if slightly smaller the front and rear ends or the rear ends alone will be brought together, but will only be brought toward each other until the desired clamping pressure is obtained.

A strip of rubber $j$ may be placed within the shoe along the flanges B C and in the angle formed by them, upon which the edge of the hoof will rest. As the outer edge of the hoof grows more rapidly than any other part, this strip of rubber will permit this growth to take place without the necessity of loosening the shoe, the rubber being compressed or displaced upwardly and inwardly as the growth proceeds.

The adjustable pivotal connection between the two parts or halves of the shoe at the rear of the hoof may be made entirely separable, as shown in the modification, Fig. 9, wherein one of the extensions D is shouldered above and below to form the projection J, in which is formed the slot or recess $j'$. The other extension is grooved, as at J', thus forming a dovetail joint between the two extensions. A pin $j^2$ in the last-named extension extends through the groove thereof and engages the slot $j'$ when the two extensions are brought into engagement. The shoe may be applied to the hoof by inserting the pin part way into the slot and then swinging the two parts toward each other on their pivot, as before described, and then clamping the shoe on the hoof, as before described, or the preliminary application of the shoe may be effected by bringing the two parts toward each other laterally and then clamping, as before described.

It will be understood that the two parts need not be halves in the sense that they must be equal in length, although I prefer to have the interlocking devices directly at the front and rear, respectively. It will also be understood that I do not limit myself to any details of construction, as the same may be varied without departing from my invention.

Having now fully described my invention, what I claim, and desire to protect by Letters Patent, is—

1. A horseshoe comprising two parts or halves, an adjustable pivotal connection between the rear ends thereof, in combination with a suitable locking device for detachably securing the front ends of said parts or halves together, and a device for approximating the rear ends of said parts or halves.

2. A horseshoe comprising two parts or halves, each provided with an upwardly and inwardly extending flange adapted for engagement with the outer surface of the hoof, and an inwardly-extending flange adapted to rest against the under surface of the hoof, in combination with an adjustable pivotal connection between the rear ends thereof, and a suitable locking device for detachably securing the front ends of said parts or halves together, and a device for approximating the rear ends of said parts or halves.

3. A horseshoe comprising two parts or halves, in combination with an adjustable pivotal connection between the rear ends thereof, and a device for approximating the rear ends thereof.

4. A horseshoe comprising two parts or halves, each provided with an upwardly and inwardly extending flange adapted for engagement with the outer surface of the hoof, and an inwardly-extending flange adapted to rest against the under surface of the hoof, in combination with an adjustable pivotal connection between the rear ends thereof, and a device for approximating the rear ends thereof.

5. A horseshoe comprising two parts or halves, each provided with an upwardly and inwardly extending flange adapted for engagement with the outer surface of the hoof, and an inwardly-extending flange adapted to rest against the under surface of the hoof, extensions on the rear ends of said parts or halves connected together by a pin-and-slot connection so as to be free to move toward and from each other laterally, and a suitable locking device for detachably securing the front ends of said parts or halves together.

6. A horseshoe comprising two parts or halves, each provided with an upwardly and inwardly extending flange adapted for engagement with the outer surface of the hoof, and an inwardly-extending flange adapted to rest against the under surface of the hoof, extensions on the rear ends of said parts or halves connected together by a pin-and-slot connection so as to be free to move toward and from each other laterally, a suitable locking device for detachably securing the front ends of said parts or halves together, and a device for approximating the rear ends of said parts or halves.

7. A horseshoe comprising two parts or halves, each provided with an upwardly and inwardly extending flange adapted for engagement with the outer surface of the hoof, and an inwardly-extending flange adapted to rest against the under surface of the hoof, extensions on the rear ends of said parts or halves connected together by a pin-and-slot connection so as to be free to move toward and from each other laterally, and a device for approximating the rear ends of said parts or halves.

8. A horseshoe comprising two parts or halves, in combination with an adjustable pivotal connection between the rear ends thereof, a device for approximating the rear ends thereof, and a device for approximating the front ends thereof.

9. A horseshoe comprising two parts or halves, each provided with an upwardly and inwardly extending flange adapted for engagement with the outer surface of the hoof, and an inwardly-extending flange adapted to rest against the under surface of the hoof, in combination with an adjustable pivotal connection between the rear ends thereof, a device for approximating the rear ends thereof, and a device for approximating the front ends thereof.

10. A horseshoe provided with an inwardly and upwardly extending flange adapted for engagement with the outer surface of the hoof, and an inwardly and upwardly extending flange adapted to rest against the under surface of the hoof, in combination with a strip of rubber resting against the inner surface of both of said flanges having its greatest thickness at the inner angle between the two flanges.

11. A horseshoe provided with an inwardly and upwardly extending flange adapted for engagement with the outer surface of the hoof, and an inwardly and upwardly extending flange adapted to rest against the under surface of the hoof, in combination with a strip of rubber resting against the upper surface of the lower flange and having its greatest thickness at the inner angle between the two flanges and tapering transversely toward the inner edge of said lower flange.

In testimony of which invention I have hereunto set my hand.

HARRY D. SHAIFFER.

Witnesses:
 FRANK S. BUSSER,
 CAROL. H. DESHONG.